C. A. SHERMAN.
TEA BREWING APPARATUS.
APPLICATION FILED OCT. 31, 1911.
1,030,752.
Patented June 25, 1912.
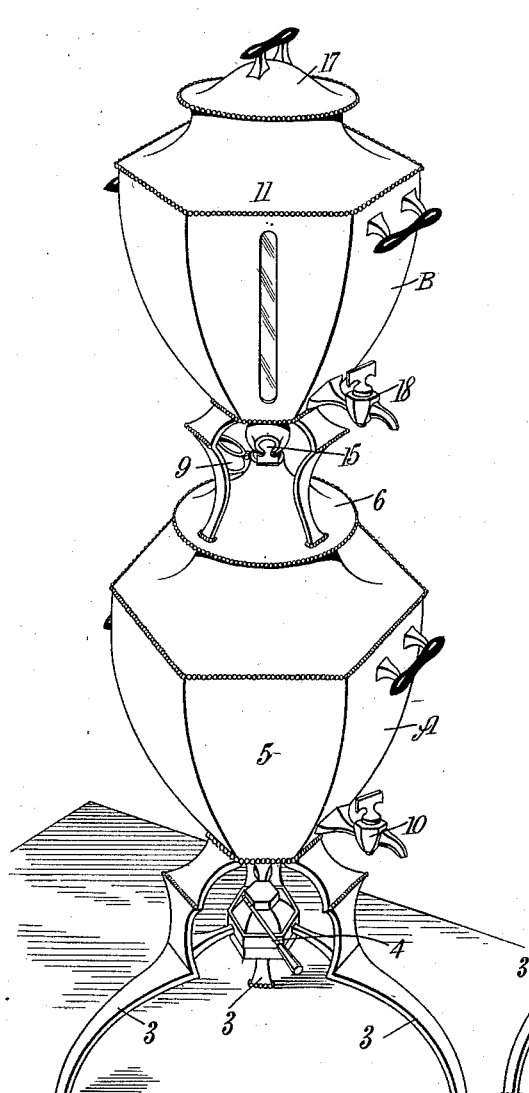
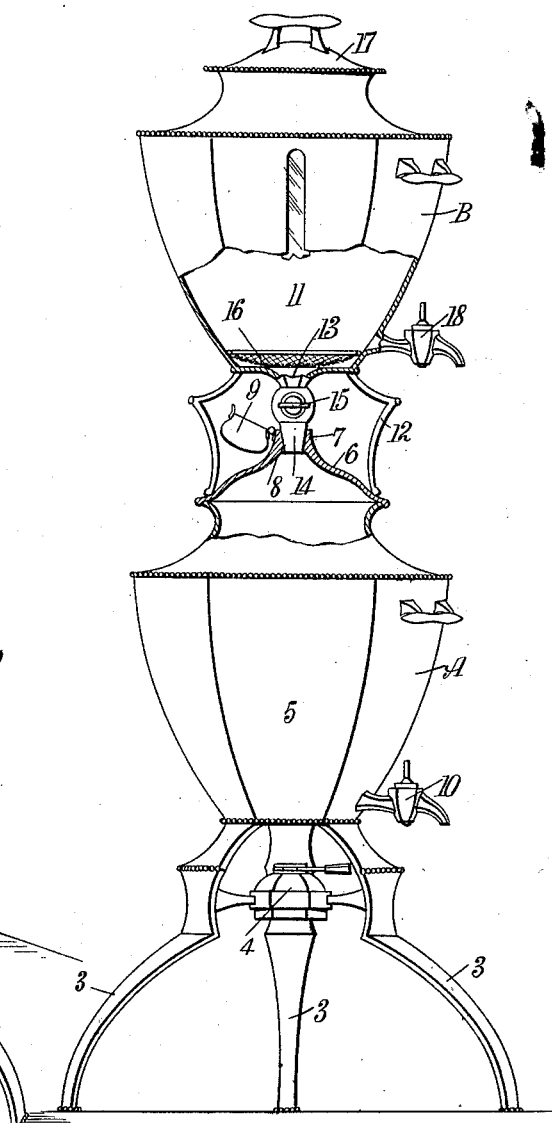
WITNESSES
INVENTOR
Charles A. Sherman
BY 
ATTORNEYS

UNITED STATES PATENT OFFICE.

CHARLES A. SHERMAN, OF NEW YORK, N. Y.

TEA-BREWING APPARATUS.

1,030,752.  Specification of Letters Patent.  Patented June 25, 1912.

Application filed October 31, 1911. Serial No. 657,785.

*To all whom it may concern:*

Be it known that I, CHARLES A. SHERMAN, a citizen of the United States, and a resident of the city of New York, borough of Manhattan, in the county and State of New York, have invented a new and Improved Tea-Brewing Apparatus, of which the following is a full, clear, and exact description.

My invention relates to an apparatus for making a beverage decoction, and more particularly relates to an apparatus for making the beverage of different strengths.

It is well known that tea which remains in contact with the leaves, gradually absorbs from the leaves a large percentage of tannic acid, which acid is objectionable to some persons, while others prefer the strong flavor caused by the free acid.

An object of my invention is to provide an urn composed of two independent units, in the upper one of which the tea or other infusion may be brewed and directly withdrawn from the same, or the infused liquid may be withdrawn from its contact with the tea or other substance into the lower unit or receptacle.

I attain the above-outlined object by disposing upon a receptacle having heating means attached thereto and an outlet cock leading therefrom, a second receptacle complete in itself, having supporting legs and a withdrawing cock and carrying a valve nipple by means of which fluid connection may be afforded to the lower receptacle.

Reference is to be had to the accompanying drawings, forming a part of this specification, in which similar characters of reference indicate corresponding parts in both the views, and in which—

Figure 1 is a perspective view showing a preferred embodiment of my invention; and Fig. 2 is a side elevation of the device shown in Fig. 1, parts being broken away to disclose the interior of the same.

In both of the figures, there is shown a lower receptacle A, mounted upon which is an upper receptacle B, both receptacles forming my improved urn. It is to be understood that these receptacles may be of any approved shape, construction and size, but preferably are so constructed that the upper receptacle may be supported on the lower, if desired.

Described more in detail, the lower urn A is supported by spindles or legs 3, which legs carry a lamp or other heating means 4 positioned below the bottom of the receptacle 5. The receptacle 5 is closed by means of a conical lid 6, the apex 7 of which lid has a truncated cone-shaped inlet 8 extending therethrough, by means of which access is obtained to the interior of the receptacle 5, which inlet may be closed by means of a hinged cap 9 pivoted to the lid 6. A suitable cock 10 extends from the lower part of the receptacle 5 by means of which cock the fluid within the receptacle may be withdrawn. It will be understood that the urn so described, is a complete unit in itself and may be used in the same manner as similar coffee and tea urns now on the market.

Adapted to be disposed on top of the lid 6, if so desired, is an urn B comprising a receptacle 11, which receptacle is supported from the lid 6 or from any other support, as a table by means of legs. The receptacle 11 has an outlet 13 extending from the center of the bottom thereof, which outlet is in the form of a nipple 14 adapted to fit within the inlet 8, to form an air-tight joint therewith. The passage of fluid through the outlet is controlled by means of a valve 15 of any suitable construction. Disposed on the bottom of the receptacle 11, is a strainer 16, which strainer is adapted to carry the tea leaves or other substance. It will be understood that the tea leaves are placed on the strainer 16 and hot water poured on to the same through the opening in the top of the receptacle 11. The water passing through the tea leaves and through the open valve 15, will pass into the receptacle 5 from which it may be withdrawn through the cock 10. In this way, the tea is not left in contact with the leaves, and, therefore, will not absorb any tannic acid from the same. The top of the urn B has an opening therein which may be closed by a lid 17. Leading from the receptacle 11, on the plane of the screen 16, is an outlet cock 18, by means of which the strong infusion may be withdrawn from the receptacle 11. Further, it is to be understood that the urn B may be removed from the urn A and placed over any suitable heating means, to form a decoction within the urn B.

Having thus described my invention, I claim as new and desire to secure by Letters Patent:

In an urn, a pair of superimposed receptacles, each receptacle being an independent urn in itself, each of said receptacles having spaced-apart supporting legs depending therefrom, each of said receptacles having a cover, the cover of the lower of said receptacles supporting the legs of the upper receptacle, said lower cover having an inlet therethrough and a cap adapted to cover said inlet, the bottom of said upper receptacle having a valve-controlled nipple depending therefrom adapted to fit in the inlet in the cover of said lower receptacle.

In testimony whereof I have signed my name to this specification in the presence of two subscribing witnesses.

CHARLES A. SHERMAN.

Witnesses:
W. S. ORTON,
PHILIP D. ROLLHAUS.

Copies of this patent may be obtained for five cents each, by addressing the "Commissioner of Patents, Washington, D. C."